US006288177B1

(12) United States Patent
Ooura et al.

(10) Patent No.: US 6,288,177 B1
(45) Date of Patent: Sep. 11, 2001

(54) PROCESS FOR PRODUCING A VINYL CHLORIDE POLYMER IN THE PRESENCE OF A CHELATING AGENT

(75) Inventors: Makoto Ooura, Hasaki-machi; Tadashi Amano, Kamisu-machi, both of (JP)

(73) Assignee: Shin-Etsu Chemical Co., Ltd., Tokyo (JP)

( * ) Notice: Subject to any disclaimer, the term of this patent is extended or adjusted under 35 U.S.C. 154(b) by 0 days.

(21) Appl. No.: 09/182,411

(22) Filed: Oct. 30, 1998

(30) Foreign Application Priority Data

Oct. 30, 1997 (JP) .......... 9-314481

(51) Int. Cl.[7] .......... C08F 2/16

(52) U.S. Cl. .......... 526/62; 526/74; 526/93; 526/344.2

(58) Field of Search .......... 526/62, 74, 93, 526/344.2

(56) References Cited

U.S. PATENT DOCUMENTS 4,732,784 * 3/1988 Laroche et al. .......... 526/62 X
6,022,932 * 2/2000 Ooura .......... 526/62
6,037,426 * 3/2000 Shimizu .......... 526/62

* cited by examiner

*Primary Examiner*—Fred Teskin
(74) *Attorney, Agent, or Firm*—Oblon, Spivak, McClelland, Maier & Neustadt, P.C.

(57) ABSTRACT

There is provided a process for producing a vinyl chloride polymer wherein in a polymerization vessel, vinyl chloride monomer or a vinyl monomer mixture comprised mainly of vinyl chloride monomer is polymerized by the aid of a polymerization initiator in an aqueous medium, comprising previously forming a coating film comprised of a polymer scale deposition preventive agent prior to the polymerization on the inner wall surface of the polymerization vessel and the other areas, to which said monomer contacts during the polymerization, by coating thereon a coating solution containing the polymer scale deposition preventive agent by the aid of steam as a carrier; and carrying out said polymerization in the presence of a chelating agent capable of forming a Fe(II) or Fe(III) complex in said aqueous medium. According to the process, while preventing polymer scale deposition on the areas where polymer scale deposition has hitherto been hardly prevented in the polymerization of vinyl chloride or the like using an aqueous medium in a polymerization vessel, such as baffles' surfaces facing the inner wall surface of a polymerization vessel and near the interface between gas phase/liquid phase at which scales are liable to deposit by repeating polymerization, a high quality polymer product little in initial discoloration can be obtained.

22 Claims, 3 Drawing Sheets

Wash water
Polymer scale preventive agent coating solution
Steam
PG

Wash water
Polymer scale
preventive agent
coating solution
Steam
PG
21
22
17
18
19
16
20
23
15
7
13
6
5
A
14
1
1a
3
B
2
4
1c
24
8
11
12
9
10

PROCESS FOR PRODUCING A VINYL CHLORIDE POLYMER IN THE PRESENCE OF A CHELATING AGENT

BACKGROUND OF THE INVENTION

1. Field of the Invention

The present invention relates to a process for producing a vinyl chloride polymer while controlling the formation of polymer scales.

2. Description of the Prior Art

In processes for subjecting vinyl chloride monomer or a mixture of vinyl chloride monomer and the other vinyl monomer to suspension polymerization or emulsion polymerization in the presence of a polymerization catalyst in an aqueous medium, there is the problem that polymers in the form of scales are deposited on the inner wall surface of a polymerization vessel and the areas with which monomers contact during polymerization, such as the surface of a stirrer among attached equipments for the polymerization vessel, that is, on the inner surfaces of the polymerization vessel. When the polymer scales are deposited on the inner surfaces of the polymerization vessel, as mentioned above, the efficiency of heat transfer in the wall of the polymerization vessel and the yield of polymer are lowered and in addition thereto, the deposited scales are peeled off from the polymerization vessel and mixed into the product to deteriorate the quality thereof, for example, by causing so-called fisheyes. Further, in order to remove the scales, it requires great deals of labor and time, resulting in many disadvantages, such as lowering in the operation rate of the polymerization vessel.

Especially in the case of suspension polymerization, the scales deposited inside the polymerization vessel is low in porosity (porousness) as compared to a normal polymer simultaneously produced, so that when the scales are peeled off and mixed into the polymer, the affinity of the normal polymer with plasticizers and other forming additives which are added in forming and processing steps is lowered to generate particles (so-called fisheyes) partially incompatible with the final product. Furthermore, when polymerization is repeated intact without removing the scales from the polymerization vessel, even the shape inside the polymerization vessel is changed due to the built-up of scales and as a result, especially when the built-up of scales on the stirrer becomes large, the whole suspension system is remarkably affected. Thus, the shape, particle size distribution, yield, etc. of the resulting polymer may be affected.

From the above reasons, it is indispensable to periodically remove the scales from the inner surfaces of the polymerization vessel. For this purpose, it requires to stop or suspend the operation of the polymerization vessel, resulting in increasing the cost directly irrespective of the production of the polymer. Removal of the scales is generally effected by mechanically peeling off the scales from the inner surfaces, striking a high speed jet stream of water to the same or dissolving the same in an organic solvent. In part of such a lot of work, the workers should enter in the vessel to carry out the work. However, since this accompanies the afraid that the workers touch vinyl chloride monomer which is doubted on cancer-causing, it is not desirable at all. Further, the mechanical removal of scales from the polymerization vessel causes a high possibility to damage the inner surfaces and the damage accelerates the formation of scales in the subsequent polymerization. Besides, the method of removing the scales using the solvent requires an excess cost for a solvent recovery equipment, and the operation and maintenance thereof.

Accordingly, as methods for preventing such a deposition of polymer scales, there is known a method forming a coating film of a scale deposition preventive agent and a variety of scale deposition preventive agents are proposed. These scale deposition preventive agents proposed include, for example, dyes or pigments [Japanese Patent Publication (kokoku) No. 45-30835]; polar organic compounds [Japanese Patent Publication (kokoku) No. 45-30343]; polyaromatic amine compounds [Japanese Pre-examination Patent Publication (kokai) No. 53-23381]; condensates of a phenol compound with formaldehyde or benzaldehyde [Japanese Pre-examination Patent Publication (kokai) No. 54-36389].

The formation of coating films of these scale deposition preventive agents are effected in the following manner. After the end of polymerization, a polymer slurry produced is withdrawn from a polymerization vessel and then the inside of the polymerization vessel is washed with water. Thereafter, the following three steps are effected: (1) a coating solution of the scale deposition preventive agent is spray coated on the areas with which vinyl chloride monomer contacts during polymerization, such as the inner wall surface of the polymerization vessel, from spray nozzles provided on the upper part of the gas phase zone inside the polymerization vessel (coating step), (2) the coated surface after spray coating is dried to obtain a dry coating film (drying step), and (3) the dry coating film is washed with water (water washing step). In the spray coating, the spray has been generally formed by supplying the coating solution under pressure to the spray nozzles.

After forming the coating film of the scale deposition preventive agent in the above manner, vinyl chloride monomer and the other raw materials are charged in the polymerization vessel and then polymerization is effected to produce a vinyl chloride polymer. In recent years, in order to improve productivity, it is desired to shorten the time taken to recycle a series of processes comprising the step of forming the polymer scale deposition preventive coating film, the step of charging raw materials, the step of polymerization reaction, the step of recovering unreacted monomer and withdrawing the polymer slurry, and the step of washing the inside of the polymerization vessel with water. As a part thereof, shortening of the time taken to form the coating film is required.

At the same time, for the purpose of improving productivity, there is recently employed a polymerization process using a large-sized polymerization vessel having a capacity of 40 $m^3$ or more and further being capable of shortening polymerization time. In such a polymerization process capable of shortening polymerization reaction time, a procedure increasing the amount of a polymerization initiator is employed. Since an increase in the amount of the polymerization initiator results in a large quantity of heat generated per unit time, it requires an improvement in efficiency of heat removal. Typical means for heat removal include a cooling jacket and a reflux condenser. On large-sizing the capacity of a polymerization vessel to 40 $m^3$ or more, there occurs a necessity for increasing a rate of heat removal by the reflux condenser since heat removal by the jacket is in sufficient. However, with an increase in the load of heat removal on the reflux condenser, bubbling of slurry inside the polymerization vessel is enhanced and the slurry overflows into the reflux condenser. As a result, the heat removal capacity of the reflux condenser is reduced or deposition of polymer scales takes place. In some cases, pipelines are clogged by the overflowed polymer particles and the operation of the condenser becomes impossible.

Further, on using the condenser from the beginning of polymerization, there occurs such a problem that the particle size of the resulting polymer particles becomes coarse or a bubble-like polymer is produced.

Accordingly, in case where the polymerization process shortening polymerization reaction time by using a large-sized polymerization vessel, the capacity of heat removal can not help being insufficient when only the jacket and the reflux condenser are used and the insufficient capacity of heat removal has to supplement with the other cooling means. As such other cooling means, an internal cooling device, such as a cooling coil, a draft tube or a cylindrical cooling baffle is provided in the polymerization vessel.

Now, when a coating film of a polymer scale deposition preventive agent is formed, the spray coating having a high efficiency as mentioned above is conventionally used. In the conventional spray coating, however, the coating solution can not be sufficiently coated on the areas to be shadowed when viewed from the spray nozzles inside the polymerization vessel, e.g., the surfaces of baffles provided in the polymerization vessel, facing the inner wall of the polymerization vessel, and as a result, the coating is liable to become uneven. Especially when the inside of the polymerization vessel has a complicated structure due to the provision of internal cooling devices, such insufficiently coated areas are increased. Thus, with an increase inthe number of polymerization batches to be repeated, polymer scales are more deposited on the areas where no sufficient coating films are formed. As a countermeasure therefor, the coating solution is sufficiently sprayed so as to cause no uneven coating, i.e., the coating solution of a polymer scale preventive agent is coated in a large quantity over a long time in the coating step. As a result, however, an excess quantity of spray coating is effected on the other inner surfaces and the drying time taken for the drying step must be extended with an increase in the quantity of the coating solution, and also, since the coating solution of a polymer scale deposition preventive agent remains in a large quantity in the washing step, the washing time must be extended in order to remove the remaining coating solution.

Such a long extension of the time taken to form the coating films results in the disadvantage that it goes against the above requirement for shortening the polymerization time.

In addition, the use of the polymer scale deposition preventive agent coating solution in a large quantity results in adverse affects, such as a remarkable initial-discoloration in the vinyl chloride polymer products obtained by polymerization and an increase in colored foreign matter ascribable to the scale preventive agent present in the products.

Furthermore, polymer scales are deposited on even the areas causing no uneven coating, with an increase in the number of polymerization batches. Especially the areas near the interface between the gas phase zone and the liquid phase zone during polymerization are the areas where scales are readily deposited by, for example, a decrease in flowability due to a factor such as bubbling. Thus, a further improvement in coating at said areas is required.

SUMMARY OF THE INVENTION

Accordingly, an object of the present invention is to provide a process for producing a vinyl chloride polymer capable of forming a coating film free of uneven coating in a short time by spraying a small quantity of a coating solution on the inner surfaces of a polymerization vessel, especially even on the areas to be shadowed at the time of spray coating, i.e., the areas where it has hitherto been difficult to prevent polymer scale deposition, e.g., the surfaces of internal cooling means, such as baffles, facing the inner wall surface of the polymerization vessel in the liquid phase zone thereof, and capable of effectively preventing polymer scales, to thereby obtain a polymer of high quality.

In order to accomplish the above object, the present invention provides a process for producing a vinyl chloride polymer wherein in a polymerization vessel, vinyl chloride monomer or a vinyl monomer mixture comprised mainly of vinyl chloride monomer is polymerized by the aid of a polymerization initiator in an aqueous medium, which comprises:

forming a coating film comprised of a polymer scale deposition preventive agent prior to the polymerization on the inner wall surface and other surfaces in the polymerization vessel with which said monomer or monomer mixture comes into contact during the polymerization, said coating being formed by applying to the surfaces a coating solution containing the polymer scale deposition preventive agent using steam as a carrier; and carrying out said polymerization in the presence of a chelating agent capable of forming a Fe complex in said aqueous medium.

According to the present invention, the following effects are obtained:

(1) By employing a spray coating using steam as a carrier in order to coat a polymer scale deposition preventive agent coating solution, uneven coating inside the polymerization vessel are reduced since the coating solution is sprayed in an extremely small quantity compared with that of the conventional coating solution. Particularly, uneven coating can be markedly reduced even at the areas where uneven coating has hitherto been readily caused by the conventional spray coating, e.g., the surfaces of internal cooling devices to be shadowed when viewed from the spray nozzles. Thus, a coating film having no uneven coating or having uneven coating in an extremely small area can be formed.

(2) By a combination of such a spray coating with said chelating agent, polymer scale deposition can be effectively prevented at the inner surfaces of the polymerization vessel, particularly even the sites where uneven coating has hitherto been readily caused, e.g., the surfaces of internal cooling devices to be shadowed when viewed from the spray nozzles.

(3) Since a coating solution required to obtain a desired coating film having no uneven coating can be used in a small quantity, the drying time taken for the drying step and also the water washing time taken for the washing step can be shortened. As a result, the time taken for the polymerization cycle of one batch can be shortened to thereby improve productivity.

(4) Since the quantity of a polymer scale deposition preventive agent used can be lowered, the initial discoloration of a formed product of the polymer and colored foreign matters contained in the product can be reduced to thereby improve the qualities of the polymer and the formed product thereof.

(5) A even coating film can be formed even on the inner surfaces where uneven coating has hitherto been readily caused. As a result, scale deposition is prevented even at such areas, and fish eyes can be reduced, while obtaining the effect of (3). Also in this respect, the quality of the formed product is improved.

(6) Further, even near the interface between the gas phase zone and the liquid phase zone, deposition of scale can be effectively prevented.

DETAILED DESCRIPTION OF THE PREFERRED EMBODIMENTS

Figure 1:
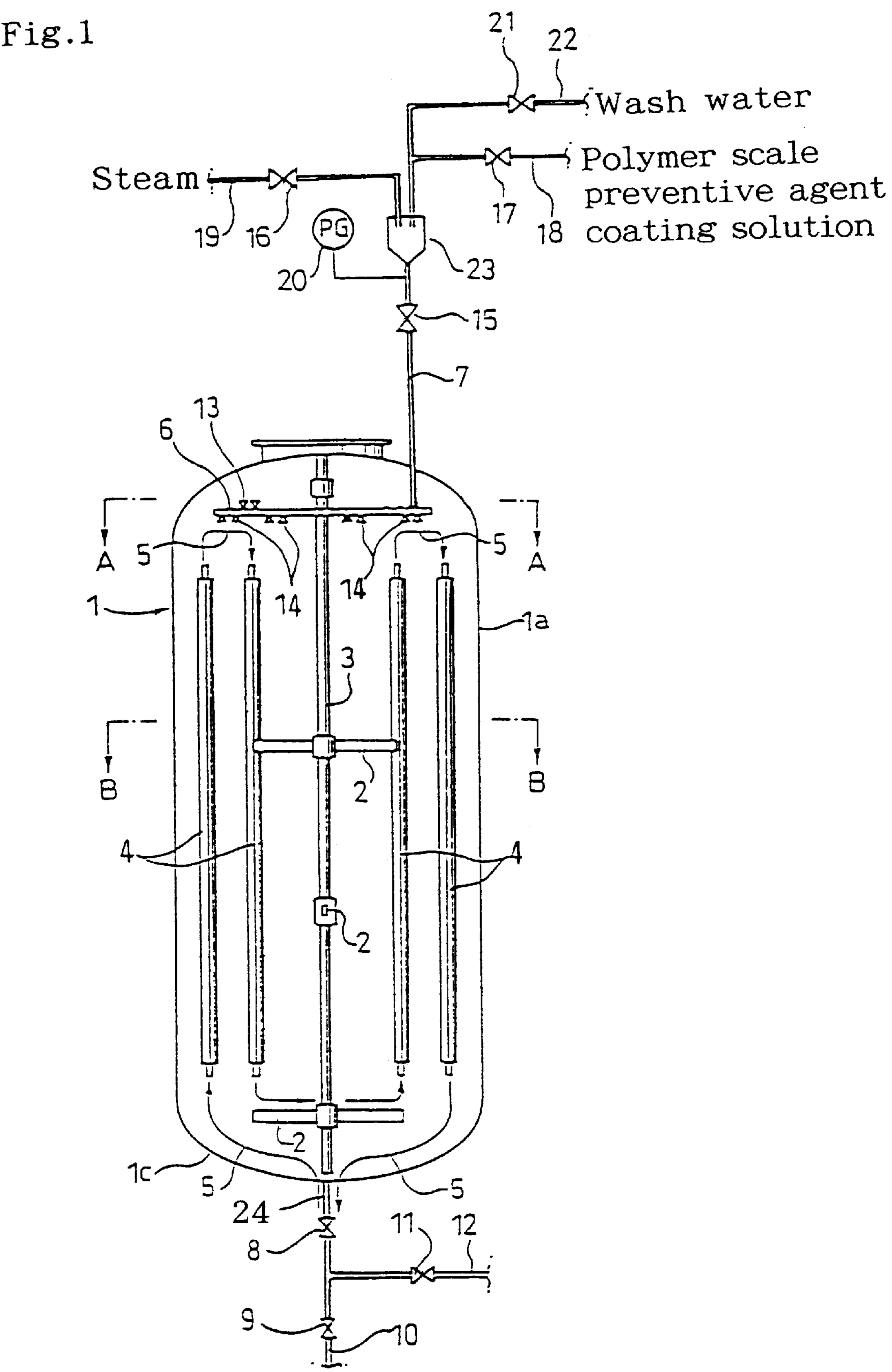
FIG. 1 is a schematic illustration of a vertical cross section of a polymerization apparatus.

The present invention will be described below in more detail.

Monomers

Vinyl monomers to be polymerized by the process for producing vinyl chloride polymers according to the present invention include vinyl chloride monomer alone, and also a monomeric mixture of vinyl chloride as a main component with other monomer or monomers copolymerizable with vinyl chloride (usually a mixture containing 50% by weight or more of vinyl chloride). The monomer copolymerizable with vinyl chloride is exemplified by vinyl esters, such as vinyl acetate and vinyl propionate; acrylates or methacrylates, such as methyl acrylate or methacrylate and ethyl acrylate or methacrylate; olefins, such as ethylene and propylene; maleic anhydride; acrylonitrile; styrene; vinylidene chloride; and the other monomers copolymerizable with vinyl chloride.

5 Chelating Agent

The chelating agent, which is a chelating agent capable of forming a Fe complex in an aqueous medium, is assumed to react with iron oxide present on the stainless steel surfaces of the wall surfaces of the polymerization vessel to cause the iron oxide to dissolve out in the form of an Fe (II) complex salt or an Fe (III) complex salt in the aqueous medium, or form a stable protective complex film on the stainless steel surfaces. It is also assumed that, as a result, redox decomposition or radical formation caused by the reaction between Fe components or Fe (II) ions of the stainless steel constituting the polymerization vessel inner wall and a peroxide used as a catalyst is inhibited and furthermore the formation of scales is prevented.

It is essential for the chelating agent usable in the present invention to have an ability forming a complex of Fe (II) or Fe (III) in the aqueous reaction mixture (a polymerization system) containing vinyl chloride monomer or a vinyl monomer mixture comprised mainly of vinyl chloride monomer. Accordingly, the chelating agent is water-soluble, and specifically, includes condensed phosphoric acid type chelating agents, aminocarboxylic acid type chelating agents and oxycarboxylic acid type chelating agents, which are preferably used.

(A) The condensed phosphoric acid type chelating agents (condensed phosphoric acid compounds) include, for example;

1) linear condensed phosphoric acids represented by the general formula: $HO(HPO_3)_nH$ wherein n is an integer of 2 or more, such as pyrophosphoric acid, tripolyphosphoric acid, tetrapolyphosphoric acid and pentapolyphosphoric acid;
2) cyclic condensed phosphoric acids represented by the general formula: $(HPO_3)_n$ wherein n is an integer of 3 or more, such as trimetaphosphoric acid, tetrametaphosphoric acid and hexametaphosphoric acid;
3) ultraphosphoric acids (condensed phosphoric acids) having a network structure, represented by the general formula: $xH_2O.yP_2O_5$ wherein x and y are numbers satisfying $0<x/y<1$; and
4) salts of the linear condensed phosphoric acids, cyclic condensed phosphoric acids and ultraphosphoric acids as exemplified above.

The salts of the above 4) include, for example, salts of alkali metals, such as sodium and potassium; salts of alkali earth metals, such as calcium and magnesium; and ammonium salts. These may be in any form of normal salts, acidic salts (hydrogen salts), single salts and double salts, without any particular limitations.

In the case of the salts of the above 4), part or the whole of a plurality of hydrogen cations corresponding to acid radicals may be present in the form of salts, such as alkali metal salts and ammonium salts.

The condensed phosphoric acid type chelating agents include those having various structures, such as linear condensed phosphoric acids, cyclic condensed phosphoric acids, condensed phosphoric acids having a network structure, and salts thereof, as mentioned above, but these mixtures can be used without any trouble. Further, with regard to the molecular weight, it is not necessarily to be a single molecular weight but may be a mixture of various molecular weights.

The condensed phosphoric acid type chelating agent has a weight-average molecular weight [a weight-average molecular weight in terms of polyethylene glycol when measured by gel permeation chromatography (GPC)] in the range of preferably 170 to 30,000, more preferably 250 to 5,000.

(B) The aminocarboxylic acid (amino acid) type chelating agents (aminocarboxylic acid compounds) include ethylenediamine-N-monoacetic acid, ethylenediamine-N,N'-diacetic acid, ethylenediamine-N,N,N',N'-tetraacetic acid, N-(2-hydroxyethyl)ethylenediamine-N,N',N'-triacetic acid, N-(2-hydroxyethyl)iminodiacetic acid, iminodiacetic acid, diethylenetriamine-N,N,N',N",N"-pentaacetic acid, trans-1,2-cyclohexanediamine-N,N,N',N'-tetraacetic acid, 3,6-dioxa-1,8-octanediamine-N,N,N',N'-tetraacetic acid, nitrylotriacetic acid, triethylenetetramine-N,N,N',N",N"',N"'-hexaacetic acid, and alkali metal salts, ammonium salts and esters thereof.

(c) The oxycarboxylic acid type chelating agents (oxycarboxylic acid compounds) include those having a carboxyl group and a hydroxyl group per molecule, for example, aliphatic oxycarboxylic acids, such as glycolic acid, gluconic acid, lactic acid, hydroacrylic acid, α-hydroxybutylic acid, glyceric acid, tartronic acid, malic acid, tartaric acid and citric acid; aromatic oxycarboxylic acids, such as salicylic acid, m-hydroxybenzoic acid, p-hydroxybenzoic acid, gallic acid, mandelic acid and tropic acid; and alkali metal salts, ammonium salts and esters thereof, without particularly limiting thereto. As these oxycarboxylic acids, those having asymmetric carbon atoms (optical isomers) maybe any of D-form, L-form and DL-form.

Of the above oxycarboxylic acids used, preferred are polycarboxylic acid type oxycarboxylic acids (having two or more carboxylic acid groups per molecule), such as tartronic acid, malic acid, tartaric acid and citric acid.

The chelating agents exemplified above may be used singly or in the form of a mixture of two or more thereof.

Of the chelating agents exemplified above used, preferred are the condensed phosphoric acid type chelating agents.

In the present invention, the chelating agent is added to the polymerization system in an amount of preferably from 10 to 1,000 ppm, more preferably from 20 to 500 ppm, and particularly preferably from 25 to 200 ppm, based on the weight of the monomers to be charged. If the amount of the chelating agent is too small, no sufficient scale preventive effect can 35 be obtained, while if it is too large, there occurs the disadvantage that the resulting vinyl chloride polymer has a broad particle size distribution.

Production Process

The chelating agent is usually added to materials to be charged into the polymerization vessel (charge materials) before the polymerization is initiated.

Other polymerization conditions may be, as briefly described below, the same as those conventionally used when vinyl chloride polymers are produced by polymerization in an aqueous medium.

As the polymerization initiator, an oil-soluble polymerization initiator and/or a water-soluble polymerization initiator may be used. The oil-soluble polymerization initiators include, for example, percarbonates, such as diisopropyl peroxydicarbonate, di-2-ethylhexyl peroxydicarbonate and diethoxyethyl peroxydicarbonate; peresters, such as t-butyl peroxyneodecanoate, α-cumyl peroxyneodecanoate and t-butyl peroxyneodecanoate; peroxides, such as acetylcyclohexylsulfonyl peroxide and 2,4,4-trimethylpentyl-2-peroxyphenoxyacetate; and azo compounds, such as azobis-2,4-dimethylvaleronitrile and azobis-(4-methoxy-2,4-dimethylvaleronitrile). The water-soluble polymerization initiators include, for example, potassium persulfate, ammonium persulfate and hydrogen peroxide. These polymerization initiators exemplified herein may be used singly or in a combination of two or more thereof.

The polymerization initiator may be added while water or monomers are charged or after they have been charged. Alternatively, it may be previously uniformly mixed in monomers so that it can be charged together with the monomers. Still alternatively, it may be charged together with the aqueous medium (water) in the form of an aqueous emulsion.

Any of these polymerization initiators are preferable when used in an amount of from 0.01 to 0.2 part by weight per 100 parts by weight of the monomer or monomers (vinyl chloride monomer or said vinyl monomer mixture) to be charged.

As a dispersion stabilizer, those conventionally used in the polymerization of vinyl chloride monomer may be used, specifically including water-soluble starch type ethers; water-soluble polymers, such as acrylic polymers (e.g., polyacrylic acid), gelatin, partially saponified polyvinyl alcohols, and cellulose ethers; oil-soluble partially saponified polyvinyl alcohols; oil-soluble emulsifiers, such as sorbitan monolaurate, sorbitan trioleate, sorbitan monostearate, glycerol tristearate, and ethylene oxide-propylene oxide block copolymer; water-soluble emulsifiers, such as polyoxyethylene sorbitan monolaurate, polyoxyethylene glycerol oleate and sodium laurate; calcium carbonate, calcium phosphate and sodium dodecylbenzenesulfonate. They may be used singly or in a combination of two or more thereof. The total amount of the polymerization initiators may be suitably controlled within the range of from 0.02 to 1 part by weight per 100 parts by weight of the monomer or monomers to be charged.

It is also possible to optionally add a polymerization modifier, a chain transfer agent, a pH adjuster, a gelation improver, an antistatic agent and so forth.

The aqueous medium to be used for dispersing monomers may be in an amount of about 1.0 to 1.5 as a weight ratio of the medium to the monomers, as in the conventional methods. If necessary, an additional water may be added in the course of polymerization. Polymerization temperature may be about 40 to 70° C. as in the conventional methods.

Also, methods for charging an aqueous medium, vinyl chloride monomer, other comonomers optionally used, a dispersing agent, a polymerization initiator and so forth into a polymerization vessel may be carried out according to the conventional methods. Further, the amounts thereof may be also the same as in the conventional methods.

In the present invention, the polymerization process carried out in an aqueous medium includes suspension polymerization and emulsion polymerization. Among them, it is preferred to use suspension polymerization.

The process of the present invention in the case where a polymerization vessel provided with a stirrer and a jacket is used is particularly effective when the polymerization vessel having two or more, preferably four or more, cooling baffles therein is used.

The polymer scale preventive agent used for forming the coating film, a method of preparing a coating solution therefor and a method of forming the coating film will be described below.

Polymer Scale Preventive Agent

The polymer scale preventive agent used in the coating solution contains as an effective component an organic compound having at least 10 conjugated π-bonds (hereinafter, referred often to as "conjugated π-bond compound"), and also the conjugated π-bond compound has a molecular weight of 1,000 or more, preferably 1,500 or more. The molecular weight of the organic compound is preferably 50,000 or less, more preferably 20,000 or less. The molecular weight of this conjugated π-bond compound is measured by gel permeation chromatography (GPC). Preferred examples of such a conjugated π-bond compound are as shown below.

Aldehyde Compound/Aromatic Hydroxyl Compound Condensation Products

The aldehyde compound/aromatic hydroxyl compound condensation product is a condensation product of an aldehyde compound with an aromatic hydroxyl compound. The use of such aldehyde compound/aromatic hydroxyl compound condensation products in polymer scale preventive agents are disclosed in, for example, Japanese Pre-examination Patent Publication (kokai) No.57-192413, Japanese Patent Publication (kokoku) No. 6-62709 and Japanese Pre-examination Patent Publication (kokai) No. 57-164107.

The aldehyde compounds include, for example, formaldehyde, acetaldehyde, propionaldehyde, butylaldehyde, acrolein, crotonaldehyde, benzaldehyde, furfural, phenylacetaldehyde, 3-phenylpropionaldehyde and 2-phenylpropionaldehyde. From industrial and economical viewpoints, formaldehyde and acetaldehyde are advantageous.

The aromatic hydroxyl compounds include, for example, dihydroxybiphenyl compounds, naphthol compounds, phenol compounds, tannins and dimeric compounds of 2,3-dihydroxynaphthalene.

Examples of the dihydroxyphenyl compounds include 2,2'-dihydroxybiphenyl, 2,2'-dihydroxy-5,5'-dimethylbiphenyl, 2,2'-dihydroxy-4,4', 5,5'-tetramethylbiphenyl, 2,2'-dihydroxy-5,5'-dichlorobiphenyl, 2,2'-dihydroxy-5,5'-dichlorohexylbiphenyl and 2,2'-dihydroxy-5,5'-di-tert-butylbiphenyl. In particular, from an industrial viewpoint, 2,2'-dihydroxybiphenyl is preferred.

Examples of the naphthol compounds include 1-naphthol, 1,3-dihydroxynaphthalene, 1,5-dihydroxynaphthalene and 1,7-dihydroxynaphthalene.

The phenol compounds include phenol, cresol, pyrogallol, hydroxyhydroquinone, resorcin, catechol, hydroquinone, bisphenol-A, hydroxybenzoic acid and salicylic acid.

The tannins include tannic acid, Chinese gallotannin, Turkish gallotannin, sumac tannin, quebracho tannin, and tannin of persimmon (shibuol). The dimeric compounds of 2,3-dihydroxynaphthalene include, for example, 2,3,2'3'-tetrahydroxybinaphthyl.

The above condensation product of an aldehyde compound with an aromatic hydroxyl compound can be produced by reacting these reactive components in a suitable medium in the presence of a catalyst, usually at room temperature to 200° C. for 2 to 100 hours, preferably at 30 to 150 ° C. for 3 to 30 hours.

The medium in which the above reaction is carried out includes, for example, water; and organic solvents, such as alcohols, ketones and esters. The organic solvents include, for example, alcohols, such as methanol, ethanol and propanol; ketones, such as acetone and methyl ethyl ketone; and esters, such as methyl acetate and ethyl acetate.

The medium in which the above reaction is carried out has a pH within the range of usually from 1 to 13, and pH adjusters may be used without any particular limitations.

The catalyst used in the above condensation reaction includes, for example, acidic catalysts, such as sulfuric acid, hydrochloric acid, perchloric acid, p-toluenesulfonic acid, methanesulfonic acid and trifluoromethanesulfonic acid; and basic catalysts, such as NaOH, KOH and $NH_4OH$.

The proportion of the aldehydes to the aromatic hydroxyl compounds used when the condensation reaction is carried out depends on the types of the aldehyde compounds, aromatic hydroxyl compounds, solvents and catalysts used, the reaction time, the reaction temperature and so forth. Generally, it is preferable to use from 0.1 to 10 mols of the aldehyde compound per mol of the aromatic hydroxyl compound.

Pyrogallol/Acetone Condensation Products

The pyrogallol/acetone condensation product is a ondensation product of pyrogallol with acetone, the molar ratio of the pyrogallol to the acetone being in the range of usually from 1/0.1 to 1/10, and the melting points thereof being usually from 100 to 500° C. The melting point is higher with an increase in molecular weights. For example, melting points of from 160 to 170° C. correspond to molecular weights of from 1,450 to 1,650; and melting points of from 200 to 220° C., to molecular weights of from 2,600 to 4,000. The use of such pyrogallol/acetone condensation products in polymer scale preventive agents is disclosed in, for example, Japanese Pre-examination Patent Publication (kokai) No. 4-328104.

The pyrogallol/acetone condensation product can be produced by dissolving pyrogallol in acetone, and condensing them in the presence of a condensation catalyst. The pyrogallol is used in an amount of usually from 1 to 100 parts by weight per 100 parts by weight of the acetone. As the condensation catalyst, for example, phosphorus oxychloride is used. The reaction may be carried out at room temperature to 100° C.

Polyhydric Phenol Self-condensation Products and Polyhydric Naphthol Self-condensation Products Polyhydric phenols are exemplified by catechol, resorcinol, chlororesorcinol, hydroquinone, phloroglucinol and pyrogallol; dihydroxy-toluene and xylene; trihydroxy-toluene and xylene; ethyl-di-, propyl-di-, butyl-di- or pentyl-di-hydroxybenzene; and trihydroxybenzene. Polyhydric naphthols are exemplified by naphthol derivatives, such as 1,3-, 1,4-, 1,5- or 1,7-dihydroxynaphthalene. The use of such polyhydric phenol self-condensation products and polyhydric naphthol self-condensation products in polymer scale preventive agents is disclosed in, for example, Japanese Pre-examination Patent Publication (kokai) No. 54-7487.

The polyhydric phenol self-condensation product or polyhydric naphthol self-condensation product can be produced by heating polyhydric phenol or polyhydric naphthol in an inert atmosphere, such as nitrogen, argon or the like, at a temperature ranging from 200 to 350° C. for 4 to 100 hours. In this reaction, various catalysts may be used, as exemplified by zinc chloride, aluminum chloride and sodium hydroxide.

Aromatic Amine Compound Condensation Products

The aromatic amine compound condensation products include, for example;

(1) a self-condensation product of an aromatic amine compound;

(2) a condensation product of an aromatic amine compound with a phenol compound;

(3) a condensation product of an aromatic amine compound with an aromatic nitro compound; and (4) a basic product obtained by making basic a condensation product of an aromatic amine compound with an aromatic nitro compound by the use of an alkali metal salt or an ammonium compound.

The use of such aromatic amine compound condensation products is disclosed in, for example, Japanese Patent Publications (kokai) No. 59-16561 and No. 60-30681.

The aromatic amine compounds are exemplified by aniline, o-, m- or p-phenylenediamine, o-, m- or p-aminophenol, o-, m- or p-chloroaniline, p-aminobenzene, 2,4-diaminoazobenzene, p-aminoacetanilide, o-, m- or p-methylaniline, 4,4-diaminodiphenylamine, N,N-dimethyl-p-phenylenediamine, 4-chloro-o-phenylenediamine, 4-methoxy-o-phenylenediamine, 2-amono-4-chlorophenol, 2,3-diaminotoluene, 2,4-diaminophenol, and diphenylamines such as 4-aminodiphenylamine, 2-aminodiphenylamine, 4,4'-diaminodiphenylamine, 4-amino-3'-methoxydiphenylamine, and 4-amino-4'-hydroxydiphenylamine.

The phenol compounds are specifically exemplified by phenol; and phenol derivatives, such as hydroquinone, resorcinol, catechol, hydroxyhydroquinone, pyrogallol, o-, m- or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

The aromatic nitro compounds are exemplified by nitrobenzene, o-, m- or p-hydroxynitrobenzene, o-, m- or p-nitroanisole, o-, m- or p-nitrophenetole, o-, m- or p-chloronitrobenzene, o-, m- or p-aminonitrobenzene, o-, m- or p-nitrobenzoic acid, o-, m- or p-nitrobenzenesulfonic acid, o-, m- or p-nitroaniline, 2-nitro-p-phenylenediamine, 2-amino-4-nitrophenol, 2-amino-5-nitrophenol and 4-amino-2-nitrophenol.

In order to carry out the self-condensation reaction of an aromatic amine compound alone, the condensation reaction of an aromatic amine compound with a phenol compound and the condensation reaction of an aromatic amine compound with an aromatic nitro compound, a mineral acid and a condensation catalyst are used. The mineral acids are exemplified by hydrochloric acid, nitric acid, hydrobromic acid, phosphoric acid and sulfuric acid.

Preferable condensation catalysts are exemplified by permanganic acid and salts thereof, such as permanganic acid and potassium permanganate; chromic acid-related compounds, such as chromium trioxide, potassium dichromate and sodium chlorochromate; metal nitrates, such as silver nitrate and lead nitrate; halogens, such as iodine and bromine; peroxides, such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, potassium iodate and sodium chlorate; metal salts, such as ferrous chloride, ferric chloride, copper sulfate, cuprous chloride, cupric chloride and lead acetate; ozone; and oxides, such as copper oxide, mercury oxide, cerium oxide, manganese dioxide and osmic acid. It is also effective to use hydrogen peroxide and ferrous chloride in combination.

The self-condensation reaction of an aromatic amine compound alone, the condensation reaction of an aromatic amine compound with a phenol compound and the condensation reaction of an aromatic amine compound with an aromatic nitro compound may be carried out in the presence of a condensation catalyst at 100 to 350° C. for 2 to 100 hours.

The proportion of an aromatic amine compound to a phenol compound or an aromatic nitro compound, which are used in the condensation reaction of an aromatic amine compound with a phenol compound and the condensation reaction of an aromatic amine compound with an aromatic nitro compound, depends on the types of the aromatic amine compounds, phenol compounds and aromatic nitro compounds and catalysts used, the reaction time, the reaction temperature and so forth. Generally, it is preferable to use from 0.1 to 10 mols of the phenol compound or the aromatic nitro compound per mol of the aromatic amine compound.

In order to make basic a condensation product of an aromatic amine compound with an aromatic nitro compound by the use of an alkali metal salt or an ammonium compound, for example, 100 parts by weight of the condensation product of an aromatic amine compound with an aromatic nitro compound is dispersed in water, 10 to 20 parts by weight of an alkali or ammonium compound, such as NaOH, KOH, $Na_2CO_3$, $NH_4OH$ or $(NH_4)_2CO_3$ is added thereto, and the mixture obtained is heat treated at 90 to 140° C. The alkali or ammonium compound may be used in an amount sufficient to neutralize the mineral acid used at the time of the condensation reaction.

Ouinone Compound Condensation Products

The quinone compound condensation products include, for example, (A) a self-condensation product of a quinone compound, and (B) a condensation product of a quinone compound with at least one compound selected from the group consisting of an aromatic hydroxyl compound and an aromatic amine compound.

The use of such quinone compound condensation products or polyhydric naphthol self-condensation products in polymer scale preventive agents is disclosed in, for example, Japanese Pre-examination Patent Publication (kokai) Nos. 5-112603 and 6-56911.

The quinone compounds include, for example, benzoquinones and derivatives thereof, such as o-, m- or p-benzoquinone, tolu-p-quinone, o-xylo-p-quinone, thymoquinone, 2-methoxybenzoquinone, gentisyl quinone, polyporic acid and ubiquinone-n; naphthoquinones and derivatives thereof, such as 6-methyl-1,4-naphthoquinone, 2-methyl-1,4-naphthoquinone, α-naphthoquinone, juglone, lawsone, plumbagin, alkannin, echinochrome A, vitamin $k_1$, vitamin $k_2$, shikonin, β,β'-dimethyl acrylshikonin, β-hydroxyisovaleroshikonin and teracrylshikonin; anthraquinones and derivatives thereof, such as tectoquinone, 3-hydroxy-2-methylanthraquinone, anthraquinone, 2-hydroxyanthraquinone, alizarin, xanthopurpurin, rubiadin, munjistin, crysophanic acid, carminic acid, kermesic acid and laccaic acid A; and phenanthrenequinones such as phenanthrenequinone.

The aromatic amine compounds are specifically exemplified by aniline, o-, m- or p-chloroaniline, o-, m- or p-methylaniline, o-, m- or p-phenylenediamine, N,N-dimethyl-p-phenylenediamine, 4-chloro-o-phenylenediamine, 4-methoxy-o-phenylenediamine, 2,3-diaminotoluene, o-, m- or p-aminophenol, 2-amino-4-chlorophenol, 4-amino-2-aminophenol, o-, m- or p-aminobenzoic acid, 2,3-, 2,4-, 2,5-, 2,6-, 3,4-, 3,5- or 4,6-diaminobenzoic acid, 3- or 4-aminophthalic acid, 2-, 4- or 5-aaminoisophthalic acid, 4, 6-diaminoisophthalic acid, 2,5- or 2,6-diaminoterephthalic acid, 3-, 4- or 5-aminosalicylic acid, 4-hydroxyanthranilic acid, o-, m- or p-aminobenzenesulfonic acid, 2,3-, 2,4-, 2,5-, 2,6-, 3,4- or 3,5-diaminobenzenesulfonic acid, 2-amino-1-phenol-4-sulfonic acid, 6-amino-4-chloro-1-phenol-2-sulfonic acid, α-naphthylamine, β-naphthylamine, 1,5-diaminonaphthalene, 1-amino-5-hydroxynaphthalene, 1,8-diaminonaphthalene, 2,3-diminonaphthalene, 4-amino-1-naphthol, 1-amino-5-naphthol, 1,2-naphthylenediamine-7-carboxylic acid, 1,5-naphthylenediamine-2-carboxylic acid, 1,5-naphthylenediamine-4-carboxylic acid, 1,6-naphthylenediamine-4-carboxylic acid, 1,8-naphthylenediamine-4-carboxylic acid, 1,2-naphthylenediamine-3-sulfonic acid, 1,2-naphthylenediamine-4-sulfonic acid, 1,2-naphthylenediamine-5-sulfonic acid, 1,2-naphthylenediamine-6-sulfonic acid, 1,2-naphthylenediamine-7-sulfonic acid, 1,3-naphthylenediamine-5-sulfonic acid, 1,3-naphthylenediamine-6-sulfonic acid, 1,4-naphthylenediamine-2-sulfonic acid, 1,4-naphthylenediamine-7-sulfonic acid, 1.5-naphthylenediamine-2-sulfonic acid, 1,5-naphthylenediamine-4-sulfonic acid, 1,5-naphthylenediamine-7-sulfonic acid, 1,6-naphthylenediamine-2-sulfonic acid, 1,6-naphthylenediamine-4-sulfonic acid, 1,6-naphthylenediamine-7-sulfonic acid, 1,8-naphthylenediamine-4-sulfonic acid, 1,8-naphthylenediamine-3,6-disulfonic acid, 1,8-naphthylenediamine-4,5-disulfonic acid, α-amino-β-naphthalenepropionic acid, α-amino-β-naphthalenecarboxylic acid, 2-naphthylamine-1-sulfonic acid, 8-naphthylamine-1-sulfonic acid, 5-naphthylamine-1-sulfonic acid, 1-amino-2-naphthol-4-sulfonic acid, 2-amino-8-naphthol-6-sulfonic acid (γ-acid), 2-amino-5-naphthol-7-sulfonic acid (J-acid) and 1-amino-8-naphthol-3,6-disulfonic acid (H-acid), and diphenylamines, such as 4-aminodiphenylamine, 2-aminodiphenylamine, 4,4'-diaminodiphenylamine, 4-amino-3'-methoxydiphenylamine, 4-hydroxydiphenylamine, 4-amino-4'-hydroxydiphenylamine, 4-carboxydiphenylamine, 4-amino-4'-carboxydiphenylamine, 4-sulfodiphenylamine and 4-amino-4'-sulfodiphenylamine.

The aromatic hydroxyl compounds are exemplified by phenols and derivatives thereof, such as phenol, hydroquinone, resorcinol, catechol, hydroxyhydroquinone, pyrogallol, o-, m-or p-chlorophenol, o-, m- or p-hydroxybenzoic acid, 2,4-dihydroxybenzoic acid, 2,5-dihydroxybenzoic acid, 2,6-dihydroxybenzoic acid, 3,4-dihydroxybenzoic acid, 3,5-dihydroxybenzoic acid and 2,5-, 2,6- or 3,5-dihydroxytoluene.

In addition, they are exemplified by naphthols and derivatives thereof, suchas α-naphthol, β-naphthol, 1,3-, 1,4-, 1,5-, 2,3-, 2,6- or 2,7-dihydroxynaphthalene, 1-hydroxy-2-naphthoic acid and 3-hydroxy-2-naphthoic acid.

The self-condensation of a quinone compound or the condensation of a quinone compound with an aromatic hydroxyl compound and/or an aromatic amine compound is carried out in an organic solvent medium, optionally in the presence of a condensation catalyst. The organic solvent medium has a pH within the range of from 1 to 13.5, preferably from 9 to 13, and pH adjusters may be used without any particular limitations. The pH adjusters used include acidic compounds, for example, phosphoric acid, sulfuric acid, phytic acid and acetic acid; and alkali compounds, for example, alkali metal compounds or ammonium compounds, such as LiOH, KOH, NaOH, $Na_2CO_3$, $Na_2SiO_3$, $Na_2HPO_4$ and $NH_40H$; and organic amine compounds, such as ethylenediamine, monoethanolamine and triethanolamine.

As the medium for the condensation reaction, organic solvents as exemplified by alcohols, ketones and esters, or mixed solvents of water and organic solvents miscible with water are preferred. Usable organic solvents miscible with water include, for example, alcohols, such as methanol, ethanol and propanol; ketones, such as acetone and methyl ethyl ketone; and esters, such as methyl acetate and ethyl acetate.

The condensation catalyst may be optionally used which is exemplified by azo catalysts such as α,α-azobisisobutylonitrile and α,α'-azobis-2,4-dimethylvaleronitrile; elementary or molecular single halogens, such as iodine, bromine and chlorine; peroxides, such as hydrogen peroxide, sodium peroxide, benzoyl peroxide, potassium persulfate, ammonium persulfate, peracetic acid, cumene hydroperoxide, perbenzoic acid and p-menthane hydroperoxide; oxygen acids or oxygen acid salts, such as iodic acid, periodic acid, potassium periodate and sodium perchlorate. Incidentally, since the quinone compound acts as a condensation catalyst, the condensation reaction takes place even in the absence of a condensation catalyst.

The condensation reaction may be generally carried out at room temperature to 200° C. for 0.5 to 100 hours.

When (a) a quinone compound and (b) an aromatic hydroxyl compound and/or an aromatic amine compound are condensed, the proportion of both reactive components used depends on the types of the aromatic amine compounds, quinone compounds and aromatic hydroxyl compounds, the reaction temperature and the reaction time. In the present invention, however, it is preferable to use from 0.01 to 10.0 mols of the component (b) per mol of the component (a).

The polymer scale preventive agents as exemplified above can be used singly or in a combination of two or more thereof.

Preparation of Polymer Scale Preventive Agent Coatinq Solutions

In order to form a coating film comprised of a polymer scale preventive agent on the inner surfaces of a polymerization vessel, a coating solution is prepared using a suitable solvent. As solvents used for preparing the polymer scale preventive agent coating solution, they include, for example, water; alcohol solvents, suchasmethanol, ethanol, propanol, butanol, 2-butanol, 2-methyl-1-propanol, 2-methyl-2-propanol, 3-methyl-1-butanol, 2-methyl-2-butanol and 2-pentanol; ketone solvents, such as acetone, methyl ethyl ketone and methyl isobutyl ketone; ester solvents, such as methyl formate, ethyl formate, methyl acetate, ethyl acetate and ethyl acetoacetate; ether solvents, such as 4-methyldioxolane and ethylene glycol diethyl ether; furans; and non-protonic solvents, such as dimethylformamide, dimethyl sulfoxide and acetonitrile. They may be appropriately used singly or as a mixed solvent of two or more thereof.

Among the above organic solvents, preferred is a mixed solvent of water and an organic solvent miscible with water. Among the above organic solvents, organic solvents miscible with water include alcohol solvents, such as methanol, ethanol and propanol; ketone solvents, such as acetone and methyl ethyl ketone; and ester solvents, such as methyl acetate and ethyl acetate. Particularly, it is preferred that alcohol solvents are used. In the case where a mixed solvent of water and an organic solvent miscible with water is used, the organic solvent is preferably contained in such an amount that there is no danger of inflammation, evaporation and the like and there is no problem on safety in handling, for example, on toxicity. Specifically, the amount is preferably 50% by weight or less, more preferably 30% by weight or less. As a coating solution, it is preferred that one having a pH in the range of from 7.5 to 13.5, particularly from 9.0 to 12.5 is used. When the coating solution has a pH ranging as above, the polymer scale preventive effect is more enhanced. As alkali compounds used for pH adjustment, it is possible to use, for example, alkali metal compounds or ammonium compounds, such as LiOH, NaOH, KOH, $Na_2CO_3$, $Na_2HPO_4$ and $NH_4OH$; and organic amine compounds, such as ethylenediamine, monoethanolamine, diethanolamine and triethanolamine.

The concentration of the conjugated π-bond compound in the coating solution to be used when the polymer scale preventive agent is coated is in the range of preferably from 0.01 to 10% by weight, more preferably from 0.05 to 3.0% by weight.

In order to more improve the scale deposition preventive effect, the polymer scale deposition preventive agent described above preferably contains at least one additive selected from the group consisting of an inorganic colloid and an alkali metal silicate. Such an additive is presumed to have an action interacting with the conjugated n-bond compound to thereby improve the hydrophilic nature of the surface of the resulting coating film comprised of the polymer scale preventive agent and improve the adhesion of the polymer scale preventive agent to the inner walls of a polymerization vessel.

The inorganic colloids include, for example, colloids of oxides or hydroxides of metals selected from aluminum, thorium, titanium, zirconium, antimony, tin, iron andsoforth; colloids of tungstic acid, vanadium pentoxide, gold or silver; silver iodide sol; andcolloids of selenium, sulfur, silicaorthe like.

Among them, preferred are colloids of oxides or hydroxides of metals selected from aluminum, titanium, zirconium, tin and iron; and colloidal silica. These inorganic colloids may be those obtained by any production processes to which there are no particular limitations. For example, particular colloids produced by a dispersion process using water as a dispersion medium or an agglomeration process are available. The colloidal particles have a size of preferably 1 to 500 mμ.

The alkali metal silicates include, for example, metasilicates ($M_2SiO_3$), orthosilicates ($M_4SiO_4$), disilicates ($M_2Si_2O_3$), trisilicates ($M_3Si_3O_7$) and sesquisilicates ($M_4Si_3O_{10}$) (wherein in these formulae, M represents an alkali metal, such as lithium, sodium or potassium), of alkali metals; and water glass.

The inorganic colloid and the alkali metal silicate each can be used singly or in a combination of two or more thereof.

The component selected from the inorganic colloid and the alkali metal silicate is used in an amount of usually from 0.01 to 10 parts by weight, preferably from 0.05 to 5 parts by weight, per 1 part by weight of the conjugated π-bond compound.

In order to more improve the polymer scale deposition preventive effect, the above polymer scale deposition preventive agent preferably contains a water-soluble polymeric compound. This compound is also presumed to have an action interacting with the conjugated E-bond compound to improve the hydrophilic nature of a coating film surface. The water-soluble polymeric compound may be used singly or in combination with said inorganic colloid and/or said alkali metal silicate.

The water-soluble polymeric compounds include, for example, amphoteric polymeric compounds, such as gelatin and casein; anionic polymeric compounds, such as polyacrylic acid, polystyrene-sulfonic acid, carboxymethyl cellulose and alginic acid; cationic nitrogen-containing polymeric compounds, such as polyvinyl pyrrolidone and polyacrylamide; and hydroxyl group-containing polymeric compounds, such as polyethylene glycol, polyvinyl alcohol, hydroxyethyl cellulose, hydroxypropyl cellulose, and pectin. The water-soluble polymeric compound is used in an amount of usually from 0.01 to 10 parts by weight, preferably from 0.1 to 5 parts by weight, per 1 part by weight of the conjugated π-bond compound.

Formation of Coating Films

In the present invention, steam as a carrier for a coating solution is used in order to form a coating film on the inner wall surface of a polymerization vessel by using the coating solution prepared as described above. The coating film comprised of a polymer scale deposition preventive agent is formed, and thereafter, if necessary, the inner wall surface is washed with water.

The coating solution is coated on the inner wall surface of a polymerization vessel and other surfaces with which monomers come into contact during polymerization. For example, such surfaces include those of stirring blades, stirring shaft, baffles, condensers, headers, search coils, bolts, nuts and so forth. More preferably, the coating film is formed on the surfaces where polymer scales may be deposited, other than the surfaces with which monomers come into contact during polymerization, as exemplified by the inner surfaces of equipment and piplines for recovering unreacted monomers. Specifically, such surfaces include inner surfaces of monomer distillation columns, condensers, monomer storage tanks, valves and so forth.

Methods for coating a coating solution containing a polymer scale deposition preventive agent using steam as a carrier are not particularly limited. For example, steam and a polymer scale deposition preventive agent coating solution are guided separately through the respective lines into amixing vessel (mixer) in which they are mixed. Steam may be any of saturated steam and superheated steam. Steam pressure is in the range of usually 1 kg/cm$^2$G (0.0981 MPa) to 20 kg/cm$^2$G (1.97 MPa), preferably 2 kg/cm$^2$G (0.197 MPa) to 10 kg/cm$^2$G (0.981 MPa). Steam temperature is usually 110 to 250° C., preferably 120 to 200° C.

When the polymer scale deposition preventive agent comes into contact with steam, as described above, the agent is converted into the form of mists which are carried by the steam serving as a carrier. The steam containing the polymer scale deposition preventive agent thus atomized is guided through a suitable pipeline into the polymerization vessel and sprayed inside the polymerization vessel with a spray device (that is, an application device for applying a polymer scale deposition preventive agent coating solution) provided in the vessel. The structure of the spray device is not particularly limited, however, it preferably has a number of nozzles such that the mists of the polymer scale deposition preventive agent evenly prevails the all surfaces over inside the polymerization vessel. For example, there is enumerated a spray device (spray ring) 6 provided in a polymerization vessel (details are described in Example 1 later) shown in FIG. 1. The device 6 is comprised of a cyclic pipeline to part of which a pipeline 7 extending from a mixing vessel 23 is connected and on which upward nozzles 13 and downward nozzles 14 are provided.

When application is carried out using such a spray device, the temperature of the inner surfaces to be coated, including the inner wall surface of the polymerization vessel, is adjusted to 10 to 100° C., preferably 50 to 100° C., more preferably 70 to 100° C. This is effected, for example, by passing heated water through a jacket provided around the polymerization vessel.

The coating is more specifically described with reference to FIG. 1. There is no particular limitations as to the time beginning with the start of charging steam (by opening valves 15 and 16) until the start of charging the scale deposition preventive agent coating solution by opening a valve 17. The start of charging of steam and the start of charging of the coating solution may be at the same time or may be at a predetermined time interval for the purpose of, for example, stabilizing the flow rate of steam or rising the temperature of the inner wall surface of the polymerization vessel to a predetermined temperature.

By opening the valve 17, the coating solution is fed through a polymer scale deposition preventive agent coating solution pipeline 18 into the mixer 23 where the coating solution is mixed with steam and then the resulting mixture is sprayed for application from the nozzles 13 and 14 of the spray ring 6 on the inside of the polymerization vessel, as described above.

The mixing of a polymer scale deposition preventive agent coating solution with steam is carried out by introducing the stream of the coating solution and the stream of steam separately into the mixer as described above. The mixing is effected at a mixing ratio of the former to the latter ([flow 30 rate of coating solution]/[flow rate of steam]) being in the range of usually 0.001 to 1.0, preferably 0.005 to 0.5, more preferably 0.01 to 0.2.

The coating solution is used in a concentration of usually 0.1 to 20% by weight, preferably 0.5 to 15% by weight, more preferably 2 to 10% by weight.

After a predetermined amount of the coating solution is supplied, the valve 17 is closed and then the supply of steam is stopped by closing the valve 16 to complete the coating step. The end of supply of steam and the end of supply of the coating solution may be at the same time or may be at a predetermined time interval between the end of supply of the coating solution and the end of supply of steam for the purpose of washing, for example, pipelines.

Whether water washing is carried out or not after the end of application and the degree of the washing when carried out can be suitably selected. It is not necessarily to carry out the water washing in the case where the quality of the resulting vinyl chloride polymer, for example, initial discoloration which can be caused when the polymer is formed and foreign matters ascribable to a polymer scale deposition preventive agent is not significant.

A drying step after the end of coating is not particularly required but may be carried out.

EXAMPLES

In the following Examples, polymer scale deposition preventive agents containing various condensation products as effective components were used. The production examples of these condensation products are given below.

Production of Condensation Products

In the following Production Examples, the molecular weight of each condensation product obtained was measured in the following way.

Measurement of Molecular Weight

Weight-average molecular weight in terms of polystyrene was measured by gel permeation chromatography (GPC) under the following measurement conditions.

Columns:

Guard column:

Tradename: slim-pack GPC-80ODP, manufactured by Shimadzu Corporation.

Analytical columns:

Tradename: slim-pack GPC-803D, 802D, manufactured by Shimadzu Corporation.

Mobile phase: 10 mM LiBr/DMF

Flow rate: 1.0 ml/min

Detector: RI

Temperature: 60° C.

Production Example 1

Production of Condensation Product No. 1:

Into a reaction vessel having an inner capacity of 2 liter provided with a reflux condenser, a mixed solvent of methanol 450 g with water 450 g was charged and subsequently 100 g of α-naphthoquinone and 10 g of sodium hydroxide were charged. Then, the internal temperature of the reaction vessel was raised to 65° C. and the mixture in the reaction vessel was reacted at 65° C. for 10 hours, followed by cooling the same to room temperature. Thus, a solution of condensation product No. 1 was obtained.

The condensation product No. 1 had a weight-average molecular weight of 3,000.

Production Example 2

Production of Condensation Product No. 2:

Into a pressure-resistant reaction vessel, 30,000 mols (960 kg) of methanol, 100 mols (15.8 kg) of 1,8-diaminonaphthalene, 50 mols (5.4 kg) of p-benzoquinone, and 250 mols (31.5 kg) of pyrogallol were charged, and the temperature was raised to 80° C. with stirring. After the reaction was carried out at 80° C. for 5 hours, the reaction mixture was cooled to obtain a methanol solution of a condensation product. Thus, a solution of condensation product No. 2 was obtained. The condensation product No. 2 had a weight-average molecular weight of 2,000.

Production Example 3

Production of Condensation Product No. 3:

With reference to Production Example 3 disclosed in Japanese Patent Publication (kokoku) No. 6-62709, a scale deposition preventive agent was produced.

Into a pressure-resistant reaction vessel, 30 mols (5.59 kg) of 2,2'-dihydroxybiphenyl, 22.5 mols (0.711 kg) of paraformaldehyde with a purity of 95%, 0.19 kg of paratoluenesulfonic acid and 10 liters of ethylene glycol dimethyl ether were charged, and the temperature was raised to 130° C. with stirring. After the reaction was carried out at 130° C. for 17 hours, the reaction mixture was cooled to 50° C. and then put into 50 liters of water. The resin separated by putting said mixture into water was filtered and then washed with water, followed by drying to obtain 5.1 kg of a 2,2'-dihydroxybiphenyl-formaldehyde condensation resin (condensation product No. 3). The condensation product No. 3 had a weight-average molecular weight of 4,300.

Production Example 4

Production of Condensation Product No. 4:

With reference to Production Example 1 disclosed in Japanese Pre-examination Patent Publication (kokai) No. 57-164107, a scale deposition preventive agent was produced.

Into apressure-resistant reaction vessel, 250mols (36.0 kg) of 1-naphthol and 180 liters of 1N-NaOH aqueous solution (containing 180 mols, 7.2 kg, of NaOH) were charged, and the temperature was raised to 70° C. with stirring. Next, to the reaction mixture, formaldehyde (19.75 liters of 38 w/v % aqueous solution, 250 mols) was dropwise added over a period of 1.5 hours. During the addition, the internal temperature of the reaction vessel was controlled so as not to become higher than 80° C. Then, the reaction mixture was cooled to 60° C. over a period of 3 hours while continuing the stirring. Next, the temperature of the reaction mixture was raised to 98° C. to carry out the reaction at 98° C. for 0.5 hour. Thereafter, the reaction mixture was cooled to obtain an alkaline solution of a condensation product (condensation product No. 4). The condensation product No. 4 had a weight-average molecular weight of 1,500.

Production Example 5

Production of Condensation Product No. 5:

With reference to Coating Compound Synthesis 2 disclosed in Japanese Pre-examination Patent Publication (kokai) No. 57-192413, a scale deposition preventive agent was produced.

Into a pressure-resistant reaction vessel, 100 mols (12.6 kg) of pyrogallol and 100 liters of water were charged, and the pyrogallol was dissolved in the water. Next, to the solution obtained, 200 mols (21.2 kg) of benzaldehyde and 300 mols (29.4 kg) of phosphoric acid were added, and the mixture thereof was reacted at 100° C. for 6 hours. As a result, a water-insoluble reddish brown product was obtained. This water-insoluble product was washed with ether, followed by extraction with methanol to extract a methanol-soluble matter from the water-insoluble product. Then, the methanol was removed from the extract by drying to obtain condensation product No. 5 (pyrogallol-benzaldehyde condensate), as a residue, having a weight-average molecular weight of 4,000.

Production Example 6

Production of Condensation Product No. 6;

With reference to Production Example 1 disclosed in Japanese Patent Publication (kokoku) No. 59-16561, a scale deposition preventive agent was produced.

Into apressure-resistant reaction vessel, 100 mols (10.8 kg) of m-phenylenediamine, 200 mols (22.0 kg) of resorcinol and 1.04 kg of 35% hydrochloric acid (10 mols as HCl) as a catalyst were charged, and the temperature was raised to 305° C.

Immediately after the mixture in the reaction vessel reached 305° C., it was cooled. The water vapor evolved in the course of the raise in temperature and the reaction was removed, and the internal pressure was kept at 150 kPa or below. After the reaction mixture was cooled, the resulting m-phenylenediamine-resorcinol condensate was pulverized to obtain condensation product No. 6 which had a weight-average molecular weight of 3,000.

Production Example 7

Production of Condensation Product No. 7:

With reference to Production Example VI disclosed in Japanese Patent Publication (kokai) No. 59-16561, a scale deposition preventive agent was produced.

Into apressure-resistant reaction vessel, bOmols (10.9 kg) of p-aminophenol and 0.99 kg of 30% hydrochloric acid (9.5 mols as HCl) were charged, and the temperature was raised to 169° C. Immediately after the reaction mixture reached 169° C., 18 liters of xylene was slowly added. The xylene was added so that the water formed during the condensation reaction was removed as an azeotropic mixture. Next, the temperature of the reaction mixture was raised to 222° C., and the reaction was carried out at 222° C. for 3 hours. The xylene-water mixed vapor evolved during the reaction was removed, and the internal pressure was kept at 150 kPa or below. After the reaction was carried out for 3 hours, the reaction mixture was cooled. The reaction product obtained was solid. Next, the reaction product was pulverized into fine particles, and thereafter washed with water, followed by filtration and then drying to obtain condensation product No. 7 which had a weight-average molecular weight of 2,500.

Production Example 8

Production of Condensation Product No. 8:

With reference to Production Example 1 disclosed in Japanese Pre-examination Patent Publication (kokai) No. 54-7487, a scale deposition preventive agent was produced.

Into a reaction vessel, 200 mols (22.0 kg) of resorcinol was charged, which was then heated in a nitrogen atmosphere. The temperature of resorcinol was raised to 300° C., and the reaction was carried out at 300° C. for 8 hours, followed by cooling. The solid self-condensation resorcinol thus obtained was pulverized to obtain condensation product No. 8 which had a weight-average molecular weight of 1,700.

Production Example 9

Production of Condensation Product No. 9:

Into a 3-liter flask provided with a reflux condenser, 1 liter of pure water was charged and subsequently 5 g of sodium hydroxide and 50 g of 2,3,2',3'-tetrahyaroxybinaphthyl were charged. Then, after the temperature was raised to 70° C., a solution comprising 12.75 g of a 37% formaldehyde aqueous solution dissolved in 23 7.3 g of distilled water was dropwise added over 30 minutes. After the end of the addition, the resulting mixture was reacted at the same temperature for 5 hours. Thereafter, the temperature was raised to 95° C. and the reaction was continued for additional 2 hours to obtain a solution of condensation product No. 9. Incidentally, the whole reaction was carried out in $N_2$ atmosphere.

The condensation product No. 9 had a weight-average molecular weight of 9,000.

Preparation of Coating Solutions:

Using the condensation product Nos. 1 to 9 obtained in the above and the solvents and pH adjusters shown in Table 1, coating solutions (1) to (10) were prepared under conditions as shown below.

TABLE 1

| | Condensation product No. | Solvent (weight ratio) | Concentration of Coating solution (wt. %) | pH adjuster (pH value of Coating solution) |
|---|---|---|---|---|
| Coating solution (1) | No. 1 | Water/MeOH 90/10 | 4.0 | NaOH (pH = 12) |
| Coating solution (2) | No. 2 | Water/MeOH 90/10 | 4.0 | NaOH (pH = 10) |
| Coating solution (3) | No. 3 | Water/MeOH 70/30 | 4.0 | KOH (pH = 12) |
| Coating solution (4) | No. 4 | Water/MeOH 90/10 | 4.0 | NaOH (pH = 11) |
| Coating solution (5) | No. 5 | Water/MeOH 90/10 | 4.0 | KOH (pH = 11) |
| Coating solution (6) | No. 6 | Water/MeOH 70/30 | 4.0 | NaOH (pH = 12) |
| Coating solution (7) | No. 7 | Water/MeOH 90/10 | 4.0 | KOH (pH = 12) |
| Coating solution (8) | No. 8 | Water/MeOH 70/30 | 4.0 | KOH (pH = 11) |
| Coating solution (9) | No. 9 | Water/MeOH 90/10 | 4.0 | NaOH (pH = 10) |
| Coating solution (10) | No. 1 | Water/MeOH 90/10 | 0.5 | NaOH (pH = 12) |

Example 1

Figure 2:
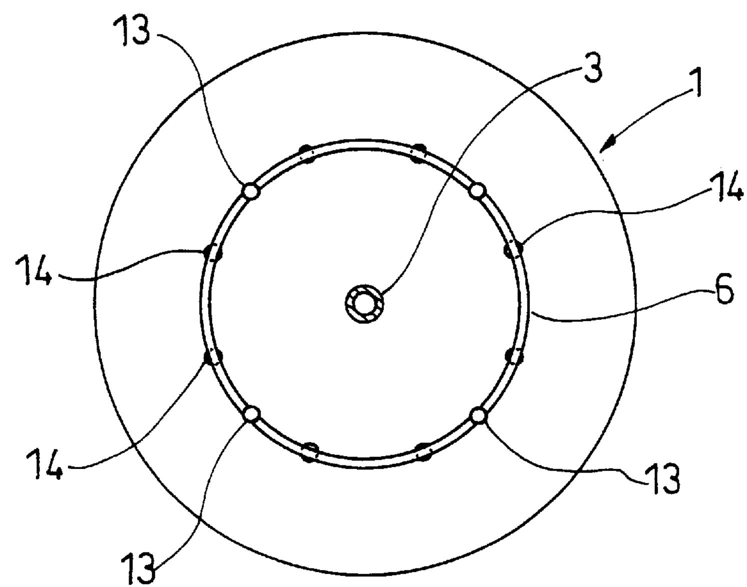
FIG. 2 is a schematic plan view of the polymerization apparatus at its cross section along the line A—A in FIG. 1.
Figure 3:
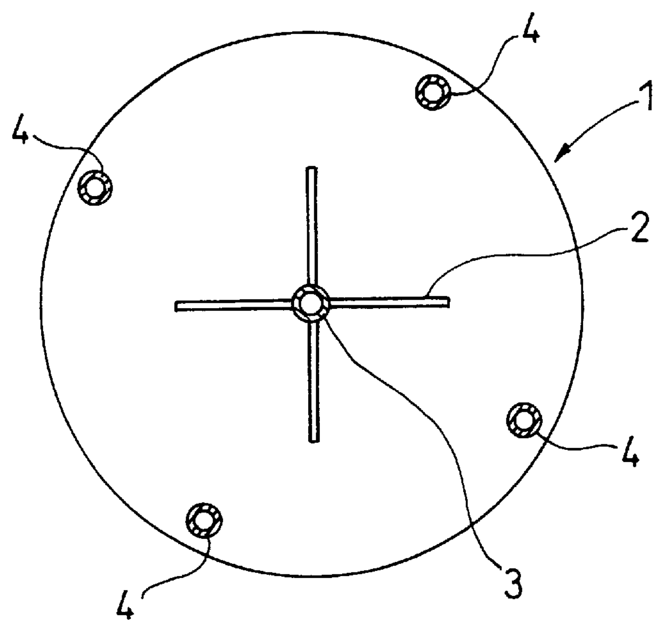
FIG. 3 is a schematic plan view of the polymerization apparatus at its cross section along the line B—B in FIG. 1.

The polymerization apparatus shown in FIGS. 1 to 3 was used. FIG. 1 is a schematic illustration of a vertical cross section of the polymerization vessel 1 of the polymerization apparatus. FIG. 2 is a horizontal cross section along the line A—A in FIG. 1, which corresponds to the position of a coating device (spray device) 6 provided at the upper part of the polymerization vessel. FIG. 3 is a horizontal cross section along the line B—B in FIG. 1.

In this apparatus, the polymerization vessel 1 is comprised of a substantially cylindrical side wall 1*a*, a substantially hemispherical ceiling 1*b* and a bottom 1*c*, and has an inner capacity of 2 $m^3$ and a horizontal cross-sectional area of 0.865 $m^2$ in the space inside the cylindrical portion. Paddle blades 2 provided on a stirrer shaft 3 disposed at the center of the polymerization vessel 1 each have a blade diameter of 517 mm. The apparatus also has, as cooling means, a reflux condenser (not shown) at the upper part of the polymerization vessel and a jacket (not shown) at the sidewall thereof.

At the upper part inside the polymerization vessel, the spray device (spray ring) 6 for coating a polymer scale deposition preventive agent coating solution is attached which is provided with upward spray-coating nozzles 13 and downward spray-coating nozzles 14, which are twelve nozzles in total. A pipeline 7 is connected to the spray device 6, and the pipeline 7 is connected to a mixer 23 through a valve 15. To the upper part of the mixer, a coating solution pipeline 18, a steam pipeline 19 and a wash water pipeline 22 are connected. These pipelines 18, 19 and 22 are provided with valves 17, 16 and 21, respectively.

As cooling baffles 4, four cooling baffles (through which cooling water is flowed as shown by streamlines 5) each made of an austenite stainless steel cylindrical pipe of 60.5 mm in outer diameter and 52.7 mm in inner diameter are provided point-to-point symmetrically at equal intervals and at the positions that do not obstruct the rotation of the paddle blades (positions: 455 mm distant from the center of the polymerization vessel). These four cooling baffles have a total horizontal cross-sectional area of 0.01149 $m^2$.

A pipeline 24 is connected to the bottom of the polymerization vessel 1 and branched to a polymer slurry withdrawal pipeline 10 and a waste liquor withdrawal pipeline 12. The pipeline 24 is provided with a valve 8, while the branched pipelines 10 and 12 are provided with valves 9 and 11 respectively.

Steps of Forming a Coating Film Comprised of a Polymer Scale Deposition Preventive Agent:

1) Hot water was passed through the jacket attached to the polymerization vessel. The supply of hot water into the jacket was stopped when the temperature of the polymerization vessel inner wall surface reached 80° C. The time taken to raise the temperature from the start of the passing of hot water to the stop of the passing of hot water was 2.5 minutes.
2) Valves 16, 17, 9 and 21 were closed, while valves 8, 11 and 15 were opened. Next, a valve 16 for controlling the flow rate of steam was opened until the pressure of a pressure gauge 20 reached 3 $kg/cm^2$G. Steam temperature and the flow rate of steam at this time were 135° C. and 300 kg/hr, respectively. After these conditions were kept for 3 minutes, the valve 17 was opened to feed the polymer scale deposition preventive agent coating solution shown in Table 2 in the amount also shown in the same table through the pipeline 18 for 3 minutes. Then, the valve 17 was closed, and after 30 seconds, the valve 16 was closed to complete the coating step. During the coating, the polymer scale preventive agent coating solution and the steam drain each remaining at the bottom inside the polymerization vessel was recovered through the waste liquor withdrawal pipeline 12.
3) Next, in the washing step, the valve 21 was opened and then wash water was fed to the spray device 6 through the wash water pipeline 22 and was sprayed out of the attached spray coating nozzles 13 and 14 to remove the polymer scale preventive agent coating solution remaining in the polymerization vessel. During the water washing, the wash liquid remaining at the bottom of the polymerization vessel was recovered through the waste liquor withdrawal pipeline 12. The spraying of wash water in the water washing step was carried for 1 minute. It took 1 minute to remove the remaining wash liquid after the valves 21 and 15 were closed. After the end of the water washing step, the valves 8 and 11 were closed.

Polymerization Step:

Into the polymerization vessel in which a coating film was thus formed, 900 kg of deionized water, the chelating agent as shown in Table 2 in the amount also shown in the same table, 360 g of a partially saponified water-soluble polyvinyl alcohol, and 60 g of a partially saponified oil-soluble polyvinyl alcohol were charged. After the inside of the polymerization vessel was evacuated, 600 kg of vinyl chloride monomer were charged and subsequently 420 g of t-butylperoxyneodecanoate were charged. Then, while stirring the content of the polymerization vessel with the stirring blades, hot water was passed through the jacket to raise the temperature of the content, whereby polymerization was initiated. When 60 minutes were passed (the temperature of the content: 57° C.) after the temperature raise started, the reflux condenser was operated to start the removal of heat of the content (the quantity of heat removed: 150 Mcal/hr). After the pressure inside the polymerization vessel dropped to 6.5 $kg/cm^2$ G (740 kPa), the reaction was stopped (the polymerization time was 4.3 hours).

After the polymerization was completed, unreacted monomers were recovered from the polymerization vessel through a recovery pipeline (not shown). Then, the valves 8 and 9 were opened and the polymer obtained was withdrawn from the vessel in the form of slurry through the polymer slurry withdrawal pipeline 10. Thereafter, the inside of the polymerization vessel was washed with water to remove a resin remaining inside the polymerization vessel. An operation ranging from the step of forming a coating film comprised of the polymer scale deposition preventive agent up to the polymerization step (beginning from the charging of materials and, through the polymerization, ending with the water washing) was set as one batch, and the same operation was repeated as many as the number of batches shown in Table 4. After the final batch was completed, the polymerization vessel inner wall surface and the cooling baffles' surfaces facing said polymerization vessel inner wall surface (the surfaces to be shadowed when viewed from the spray device 6) were observed to examine the state of polymer scale deposition. The results of observation were as shown in Table 4.

The polymer slurry withdrawn and obtained from the inside of the polymerization vessel after the final batch was completed was dehydrated and dried to obtain a vinyl chloride polymer. The vinyl chloride polymer thus obtained was subjected to initial discoloration test, fish eye test and foreign matter evaluation test according to the methods as shown below. The test results were as shown in Table 4.

Measurement of Initial Discoloration:

In 100 parts of the vinyl chloride polymer, 1.0 part of tin laurate, 0.5 part of a cadmium type stabilizer and 50 parts of a plasticizer DOP (dioctyl phthalate) were mixed, and the mixture obtained was kneaded at 160° C. for 5 minutes by means of a 6-inch roll. Thereafter, the kneaded product was formed into a sheet of 0.8 mm thick. Next, this sheet was cut into test pieces, which were then superposed in a molding frame of 4 cm×4 cm×1.5 cm, followed by heating and pressure molding at 150° C. and 67 to 70 $kgf/cm^2$ to produce test samples. The samples obtained were tested using a photoelectric colorimeter (manufactured by Nihon Denshoku Kogyo K.K.) to measure L, a and b values according to the Hunter's color difference equation as prescribed in JIS Z-8730 to evaluate initial discoloration. Simultaneously, this evaluation was also made by visual observation.

Measurement of Fish Eyes:

100 parts of the vinyl chloride polymer obtained, 50 parts of DOP, 0.1 part of barium stearate, 0.1 part of cadmium stearate, 0.8 part of cetyl alcohol, 2.0 parts of a tin type stabilizer, 0.5 part of titanium dioxide and 0.1 part of carbon black were mixed and kneaded for 5 minutes using a 140° C. 6-inch roll, and the kneaded product was taken off in the form of a sheet of 0.3 mm thick. White transparent particles present in 100 $cm^2$ of this sheet were counted.

Foreign Matter Evaluation Test:

50 g of the vinyl chloride polymer obtained was placed on white paper, and 5 ml of a destaticizing solution was added thereto, which are then thoroughly mixed. Thereafter, foreign matter particles other than the vinyl chloride polymer powder are picked up visually with a spoon. The number of foreign matter particles is indicated by: (number of foreign matter particles picked up)×2=(number of foreign matter particles in 100 g of vinyl chloride polymer).

Examples 2 to 7, Comparative Example 1

Vinyl chloride polymers were produced in the same manner as in Example 1, except that in each of these Examples and Comparative Example, the chelating agent as shown in Table 2 or 3 was added in the amount as shown in the same table or was not added at all, and that the polymerization was repeated as many as the number of batches shown in Table 4 or 5.

Comparative Examples 2 to 5

Figure 4:
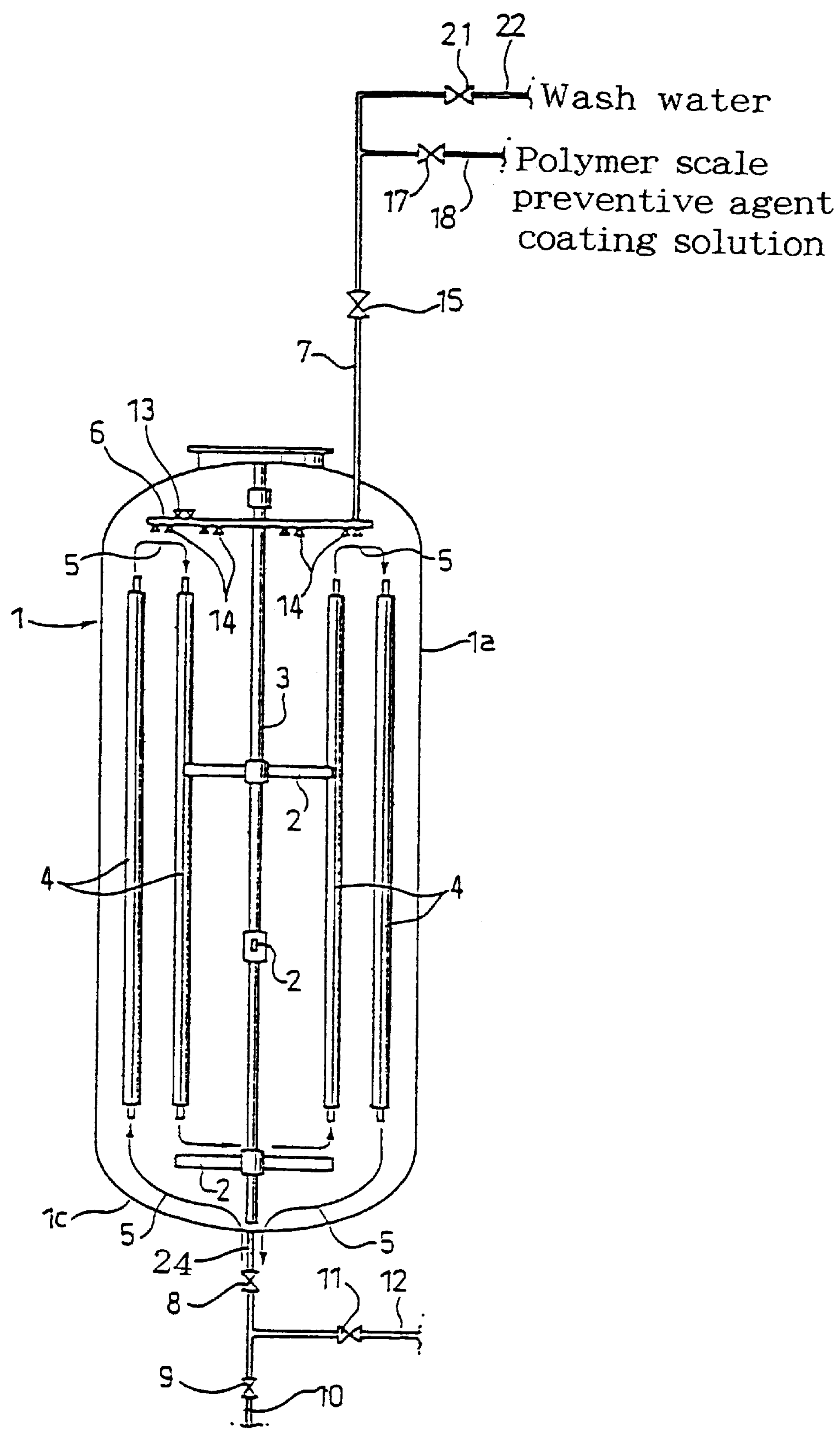
FIG. 4 is a schematic illustration of a vertical cross section of a polymerization apparatus used in Comparative Examples.

In each Comparative Example, the polymerization apparatus shown in FIG. 4 was used. The polymerization apparatus used in these Comparative Examples is the same as in Example 1, except that in the polymerization apparatus used in Example 1, the valve 16, steam pipeline 19, pressure gauge 20 and mixer 23 are lacked.

In each Comparative Example, coating of a polymer scale deposition preventive agent coating solution and polymerization were carried out as follows.

1) Hot water was passed through the jacket attached to the polymerization vessel. The passing of hot water through the jacket was stopped whe the temperature of the polymerization vessel inner wallsurface reached 50° C. The time required from the start of the passing of hot water until the stop of the passing of hot water was 2 minutes.
2) Valves 17, 9 and 21 were closed, while valves 8, 11 and 15 were opened. Next, a valve 17 was opened, and the polymer scale deposition preventive agent coating solution shown in Table 3 was spray-coated in the amount shown in the same table. The spray coating was carried out at a flow rate of 1,200 g/min. During the spray coating, the polymer scale preventive agent coating solution remaining at the bottom inside the polymerization was recovered through the waste liquor withdrawal pipeline 12.
3) After the spray coating was completed, the valve 17 was closed. It took 10 minutes at 50° C. to dry the thus formed coating film. Thereafter, the passingof hot water through the attached jacket was stopped.
4) Next, in the water washing step, the valve 21 was opened and then wash water was fed to the spray device 6 through the wash water pipeline 22, and was sprayed out of the attached spray coating nozzles 13 and 14 to remove the polymer scale preventive agent coating solution remaining in the polymerization vessel. During the water washing, the wash liquid remaining at the bottom of the polymerization vessel was recovered through the waste liquor withdrawal pipeline 12. After the end of the water washing step, the valves 21, 15, 8 and 11 were closed. The spraying of wash water in the water washing step was carried for 1 minute. It took 1 minute to recover the remaining wash liquid after the valves 21 and 15 were closed. The time taken to form a coating film comprised of the polymer scale deposition preventive agent was as shown in Table 3.

Polymerization Step:

A vinyl chloride polymer was produced in the same manner as in Example 1, except that the chelating agent shown in Table 2 was added in the amount shown in the same table and polymerization was repeated as many as the number of batches shown in Table 5.

After the final batch was completed, the polymerization vessel inner wall surface and the cooling baffles' surfaces facing said polymerization vessel inner wall surface (the surfaces to be shadowed when viewed from the spray device 6) were observed to examine the state of polymer scale deposition. The results of observation were as shown in Tables 4 and 5.

The polymer slurry withdrawn and obtained from the inside of the polymerization vessel after the final batch was completed was dehydrated and dried to obtain a vinyl chloride polymer. The vinyl chloride polymer thus obtained was tested for initial discoloration, fish eyes and foreign matter evaluation according to the test methods as described in Example 1. The test results were as shown in Tables 4 and 5.

Comparative Example 6

A vinyl chloride polymer was produced in the same manner as in Comparative Example 4, except that the polymer scale deposition preventive agent coating solution was not coated and the polymerization was repeated as many as the number of batches shown in Table 4 or 5.

After the final batch was completed, the polymerization vessel inner wall surface and the cooling baffles' surfaces facing said polymerization vessel inner wall surface (the surfaces to be shadowed when viewed from the spray device 6) were observed to examine the state of polymer scale deposition. The results of observation were as shown in Tables 4 and 5.

The polymer slurry withdrawn and obtained from the inside of the polymerization vessel after the final batch was completed was dehydrated and dried to obtain a vinyl chloride polymer. The vinyl chloride polymer thus obtained was tested for initial discoloration, fish eyes and foreign matter evaluation according to the test methods as described in Example 1. The test results were as shown in Tables 4 and 5.

TABLE 2

| Example | Type of Polymer scale deposition preventive agent coating solution | Coating method of Polymer scale deposition preventive agent coating solution | Mixing ratio *1 of Steam to Coating solution | Water washing step | Time and Coating amount required to form Coating film comprised of Polymer scale deposition preventive agent | Chelating agent*2 Type Amount added (ppm) Type | Amount added (ppm) |
|---|---|---|---|---|---|---|---|
| 1 | Coating solution (1) | Coating by Steam | 0.03 | Conducted | 11 min Amount: 450 g | Tetrapolyphospholic acid (Molecular weight: 338) | 50 |
| 2 | Coating solution (1) | Coating by steam | 0.03 | Conducted | 11 min Amount: 450 g | condensed phospholic acid Na salt (Mw: 2300) | 50 |
| 3 | Coating solution (1) | Coating by steam | 0.03 | Conducted | 11 min Amount: 450 g | condensed phospholic acid ammonium salt (Mw: 2200) | 50 |
| 4 | Coating solution | Coating by | 0.03 | Conducted | 11 min Amount: | condensed phospholic acid Ca salt | 50 |

TABLE 2-continued

| Example | Type of Polymer scale deposition preventive agent coating solution | Coating method of Polymer scale deposition preventive agent coating solution | Mixing ratio *1 of Steam to Coating solution | Water washing step | Time and Coating amount required to form Coating film comprised of Polymer scale deposition preventive agent | Chelating agent*2 Type Amount added (ppm) Type | Amount added (ppm) |
|---|---|---|---|---|---|---|---|
| | (1) | steam | | | 450 g | (Mw: 2000) | |
| 5 | Coating solution (1) | Coating by steam | 0.03 | Conducted | 11 min Amount: 450 g | Nitrilotriacetic acid | 100 |
| 6 | Coating solution (1) | Coating by steam | 0.03 | Conducted | 11 min Amount: 450 g | Citric acid | 100 |
| 7 | Coating solution (1) | Coating by steam | 0.03 | Conducted | 11 min Amount: 450 g | Tetrapolyphospholic acid Na salt (Molecular weight: 470) | 100 |

TABLE 3

| Comp. Example | Type of Polymer scale deposition preventive agent coating solution | Coating method of Polymer scale deposition preventive agent coating solution | Mixing ratio *1 of Steam to Coating solution | Water washing step | Time and Coating amount required to form Coating film comprised of Polymer scale deposition preventive agent | Chelating agent*2 Type Amount added (ppm) Type | Amount added (ppm) |
|---|---|---|---|---|---|---|---|
| 1 | Coating solution (1) | Coating by steam | 0.03 | Conducted | 11 min Amount: 450 g | None | 0 |
| 2 | Coating solution (10) | Spray coating | — | Conducted | 16 min Amount: 2,400 g | None | 0 |
| 3 | Coating solution (10) | Spray coating | — | Conducted | 19 min Amount: 6,000 g | None | 0 |
| 4 | Coating solution (10) | Spray coating | — | Conducted | 16 min Amount: 2,400 g | Tetrapolyphospholic acid (Molecular weight: 338) | 50 |
| 5 | Coating solution (10) | Spray coating | — | Conducted | 16 min Amount: 2,400 g | Tetrapolyphospholic acid (Molecular weight: 470) | 50 |
| 6 | None | — | — | Not conducted | None | Tetrapolyphospholic acid (Molecular weight: 338) | 50 |

Notes in Tables 2 and 3:

*1[Flow rate (g/min) of coating solution]/[Flow rate (g/min) of steam]

*2<Measurement of condensed phosphoric acid type compounds>

A weight-average molecular weight (Mw) in terms of polyethylene glycol was measured by gel permeation chromatography (GPC) under the following measurement conditions.

Columns: Shodex Ohpak KB-800 + KB802.5 × 2

Mobile phase: 0.1M-NaCl

Flow rate: 0.7 ml/min

Temperature: 40° C.

Detector: RI (Shodex SE-61)

TABLE 4

| Example | Number of batches | State of Polymer scale deposition: Polymerization vessel inner wall surface | State of Polymer scale deposition: Cooling baffles' surfaces facing Polymerization vessel inner wall surface | Initial discoloration test | | Fisheye test (number) | Foreign matter evaluation (number) |
|---|---|---|---|---|---|---|---|
| 1 | 40 | No scale deposition | No scale deposition | L: 72.1 a: −1.8 b: 10.5 | Good | 3 | 4 |
| 2 | 40 | No scale deposition | No scale deposition | L: 72.2 a: −1.9 b: 10.7 | Good | 4 | 6 |
| 3 | 40 | No scale deposition | No scale deposition | L: 72.0 a: −1.8 b: 10.5 | Good | 3 | 8 |
| 4 | 40 | No scale deposition | No scale deposition | L: 72.2 a: −1.8 b: 10.5 | Good | 4 | 6 |
| 5 | 30 | No scale deposition | Slight scale deposition | L: 71.9 a: −1.9 b: 10.7 | Good | 7 | 8 |
| 6 | 30 | No scale deposition | Slight scale deposition | L: 72.0 a: −1.8 b: 10.5 | Good | 6 | 8 |
| 7 | 30 | No scale deposition | Slight scale deposition | L: 71.9 a: −1.8 b: 10.7 | Good | 7 | 8 |

TABLE 5

| Comp. Ex. | Number of batches | State of Polymer scale deposition: Polymerization vessel inner wall surface | State of Polymer scale deposition: Cooling baffles' surfaces facing Polymerization vessel inner wall surface | Initial discoloration test | | Fisheye test (number) | Foreign matter evaluation (number) |
|---|---|---|---|---|---|---|---|
| 1 | 20 | No scale deposition | Scale deposition at lower part plane | L: 72.2 a: −1.8 b: 10.5 | Good | 41 | 4 |
| 2 | 5 | No scale deposition | Scale deposition at lower part plane | L: 71.9 a: −1.8 b: 10.5 | Good | 50 | 8 |
| 3 | 20 | No scale deposition | Slight scale deposition | L: 71.7 a: −1.9 b: 13.1 | Strongly yellowish; remarkably causing initial discoloration | 10 | 36 |
| 4 | 30 | Slight scale deposition near interface between gas phase/liquid phase | No scale deposition | L: 71.9 a: −1.7 b: 10.6 | Good | 21 | 12 |
| 5 | 30 | Slight scale deposition near interface between gas phase/liquid phase | Slight scale deposition | L: 71.8 a: −1.8 b: 10.8 | Good | 29 | 14 |
| 6 | 10 | Slight scale deposition at gas phase zone | No scale deposition | L: 72.3 a: −1.9 b: 10.2 | Good | 25 | 6 |

Examples 8 to 15

Polymerization was carried out in the same manner as in a Example 1, except that in each Example, the coating solution shown in Table 6 was used, the chelating agent shown in Table 6 was added in the amount shown in the same Table, and polymerization was repeated as many as the number of batches shown in Table 7.

After the final batch was completed, the polymerization vessel inner wall surface and the cooling baffles' surfaces facing said polymerization vessel inner wall surface (the surfaces to be shadowed when viewed from the spray device 6) were observed to examine the state of polymer scale deposition. The results of observation were as shown in Table 7.

The polymer slurry withdrawn and obtained from the inside of the polymerization vessel after the final batch was completed was dehydrated and dried to obtain a vinyl chloride polymer. The vinyl chloride polymer thus obtained was tested for initial discoloration, fish eyes and foreign matter evaluation according to the test methods as described in Example 1. The test results were as shown in Table 7. Incidentally, in Examples 8 and 15, the water washing was not carried out.

TABLE 6

| Example | Type of Polymer scale deposition preventive agent coating solution | Coating method of Polymer scale deposition preventive agent coating solution | Mixing ratio* of Steam to Coating solution | Water washing step | Time and Coating amount required to form Coating film comprised of Polymer scale deposition preventive agent | Chelating agent Type Amount added (ppm) | |
|---|---|---|---|---|---|---|---|
| | | | | | | Type | Amount added (ppm) |
| 8 | Coating solution (3) | Coating by steam | 0.03 | Not conducted | 9 min Amount: 450 g | Tetrapolyphospholic acid (Molecular weight: 338) | 50 |
| 9 | Coating solution (4) | Coating by steam | 0.03 | Conducted | 11 min Amount: 450 g | Tetrapolyphospholic acid (Molecular weight: 338) | 50 |
| 10 | Coating solution (5) | Coating by steam | 0.03 | Conducted | 11 min Amount: 450 g | Tetrapolyphospholic acid (Molecular weight: 338) | 50 |
| 11 | Coating solution (6) | Coating by steam | 0.03 | Conducted | 11 min Amount: 450 g | Tetrapolyphospholic acid (Molecular weight: 338) | 50 |
| 12 | Coating solution (7) | Coating by steam | 0.03 | Conducted | 11 min Amount: 450 g | Tetrapolyphospholic acid (Molecular weight: 338) | 50 |
| 13 | Coating solution (8) | Coating by steam | 0.03 | Conducted | 11 min Amount: 450 g | Tetrapolyphospholic acid (Molecular weight: 338) | 50 |
| 14 | Coating solution (9) | Coating by steam | 0.03 | Not conducted | 9 min Amount: 450 g | Tetrapolyphospholic acid (Molecular weight: 338) | 50 |
| 15 | Coating solution (2) | Coating by Steam | 0.03 | Conducted | 11 min Amount: 450 g | Tetrapolyphospholic acid (Molecular weight: 338) | 50 |

*[Flow rate (g/min) of coating solution]/[Flow rate (g/min) of steam]

TABLE 7

| Example | Number of batches | State of Polymer scale deposition | | Initial discoloration test | | Fisheye test (number) | Foreign matter evaluation (number) |
|---|---|---|---|---|---|---|---|
| | | Polymerization vessel inner wall surface | Cooling baffles' surfaces facing Polymerization vessel inner wall surface | | | | |
| 8 | 40 | No scale deposition | No scale deposition | L: 72.1 a: −1.9 b: 10.6 | Good | 4 | 6 |
| 9 | 40 | No scale deposition | No scale deposition | L: 72.2 a: −1.9 b: 10.4 | Good | 3 | 8 |
| 10 | 40 | No scale deposition | No scale deposition | L: 71.9 a: −1.5 b: 10.5 | Good | 4 | 6 |
| 11 | 40 | No scale deposition | No scale deposition | L: 72.2 a: −1.9 b: 10.7 | Good | 4 | 6 |
| 12 | 40 | No scale deposition | Slight scale deposition | L: 71.9 a: −1.8 b: 10.2 | Good | 3 | 8 |
| 13 | 40 | No scale deposition | Slight scale deposition | L: 72.0 a: −1.9 b: 10.3 | Good | 4 | 6 |
| 14 | 40 | No scale deposition | Slight scale deposition | L: 72.4 a: −1.9 b: 10.2 | Good | 3 | 6 |

TABLE 7-continued

| Example | Number of batches | State of Polymer scale deposition: Polymerization vessel inner wall surface | State of Polymer scale deposition: Cooling baffles' surfaces facing Polymerization vessel inner wall surface | Initial discoloration test | | Fisheye test (number) | Foreign matter evaluation (number) |
|---|---|---|---|---|---|---|---|
| 15 | 40 | No scale deposition | Slight scale deposition | L: 72.0 a: −1.6 b: 10.3 | Good | 3 | 7 |

What is claimed is:

1. A process for producing a vinyl chloride polymer wherein in a polymerization vessel, vinyl chloride monomer or a vinyl monomer mixture comprised mainly of vinyl chloride monomer is polymerized by the aid of a polymerization initiator in an aqueous medium, which comprises:

forming a coating film comprised of a polymer scale deposition preventive agent prior to the polymerization on the inner wall surface and other surfaces in the polymerization vessel with which said monomer or monomer mixture comes into contact during the polymerization, said coating being formed by applying to the surfaces a coating solution containing the polymer scale deposition preventive agent using steam as a carrier; and carrying out said polymerization in the presence of a chelating agent capable of forming a Fe complex in said aqueous medium: wherein said steam has a pressure in the range of 1 to 20 $kg/cm^2G$ (0.0981 to 1.97 MPa) and a temperature in the range of 110 to 250° C.; and wherein, in said applying, a ratio of a flow rate of said coating solution to a flow rate of said steam is in the range of 0.001 to 1.0.

2. The process of claim 1, wherein said chelating agent comprises at least one compound selected from the group consisting of phosphoric acid compounds, aminocarboxylic acid compounds and oxycarboxylic acid compounds.

3. The process of claim 1, wherein the amount of the chelating agent is in the range of 10 to 1,000 ppm based on the weight of said monomer or vinyl monomer mixture.

4. The process of claim 1, wherein said polymer scale deposition preventive agent comprises an organic compound having at least 10 conjugated π-bonds and a molecular weight of 1,000 or more.

5. The process of claim 4, wherein the organic compound having at least 10 conjugated π-bonds is at least one member selected from the group consisting of aldehyde compound/aromatic hydroxyl compound condensation products, pyrogallol/acetone condensation products, polyhydric phenol self-condensation products, polyhydric naphthol self-condensation products, aromatic amine compound self-condensation products, aromatic amine compound/phenol compound condensation products, aromatic amine compound/aromatic nitro compound condensation products, basic products of aromatic amine compound/aromatic nitro compound condensation products with an alkali metal salt or an ammonium compound, quinone compoound self-condensation products, quinone compound/aromatic hydroxyl compound condensation products, quinone compound/aromatic amine compound condensation products, and quinone compound/aromatic hydroxyl compound/aromatic amine compound condensation products.

6. The process of claim 1, wherein said coating solution comprises water or a mixture of water and an organic solvent miscible with water.

7. The process of claim 1, wherein said coating solution has a pH in the range of 7.5 to 13.5.

8. The process of claim 1, wherein the polymerization is effected as suspension polymerization or emulsion polymerization.

9. The process of claim 1, wherein said steam has a pressure in the range of 2 $kg/cm^2G$ (0.197 MPa) to 10 $kg/cm^2G$ (0.981 MPa).

10. The process of claim 1, wherein said steam has a temperature in the range of 120 to 200° C.

11. The process of claim 1, wherein said vinyl monomer mixture comprises 50% by weight or more of said vinyl chloride monomer.

12. The process of claim 1, wherein said vinyl monomer mixture comprises a comonomer selected from the group consisting of vinyl esters, acrylates, methacrylates, olefins, maleic anhydride, acrylonitrile, styrene, vinylidene chloride, and mixtures thereof.

13. The process of claim 1, wherein said coating solution comprises a solvent selected from the group consisting of water, alcohols, ketones, esters, ethers, non-protonic solvents, and mixtures thereof.

14. The process of claim 6, wherein said organic solvent is selected from the group consisting of alcohols, ketones, esters, and mixtures thereof.

15. The process of claim 6, wherein said organic solvent is present in an amount of 50% by weight or less, based on the weight of said coating solution.

16. The process of claim 1, wherein said polymer scale deposition preventive agent further comprises a water-soluble polymeric compound selected from the group consisting of amphoteric polymeric compounds, anionic polymeric compounds, cationic nitrogen-containing polymeric compounds, and hydroxyl group-containing polymeric compounds.

17. The process of claim 4, wherein said polymer scale deposition preventive agent further comprises a water-soluble polymeric compound in an amount of 0.01 to 10 parts by weight per 1 part by weight of the conjugated π-bond compound.

18. The process of claim 1, wherein said polymer scale deposition preventive agent further comprises at least one additive selected from the group consisting of an inorganic colloid and an alkali metal silicate.

19. The process of claim 1, wherein said vinyl monomer mixture comprises a comonomer selected from the group consisting of vinyl acetate, vinyl propionate, methyl acrylate, methyl methacrylate, ethyl acrylate, ethyl methacrylate, ethylene, propylene, maleic anhydride, acrylonitrile, styrene, vinylidene chloride, and mixtures thereof.

20. The process of claim 1, wherein said coating solution comprises a solvent selected from the group consisting of water, methanol, ethanol, propanol, butanol, 2-butanol, 2-methyl-1-propanol, 2-methyl-2-propanol, 3-methyl-1-butanol, 2-methyl-2-butanol, 2-pentanol, acetone, methyl ethyl ketone, methyl isobutyl ketone, methyl formate, ethyl formate, methyl acetate, ethyl acetate, ethyl acetoacetate, 4-methyldioxolane, ethylene glycol diethyl ether, furans, dimethyl formamide, dimethyl sulfoxide, acetonitrile, and mixtures thereof.

21. The process of claim 6, wherein said organic solvent is selected from the group consisting of methanol, ethanol, propanol, acetone, methyl ethyl ketone, methyl acetate, ethyl acetate, and mixtures thereof.

22. The process of claim 1, wherein said polymer scale deposition preventive agent further comprises a water-soluble polymeric compound selected from the group consisting of gelatin, casein, polyacrylic acid, polystyrene-sulfonic acid, carboxymethyl cellulose, alginic acid, polyvinyl pyrrolidone, polyacrylamide, polyethylene glycol, polyvinyl alcohol, hydroxy ethyl cellulose, hydroxypropyl cellulose, and pectin.

* * * * *